United States Patent Office 3,136,108
Patented June 9, 1964

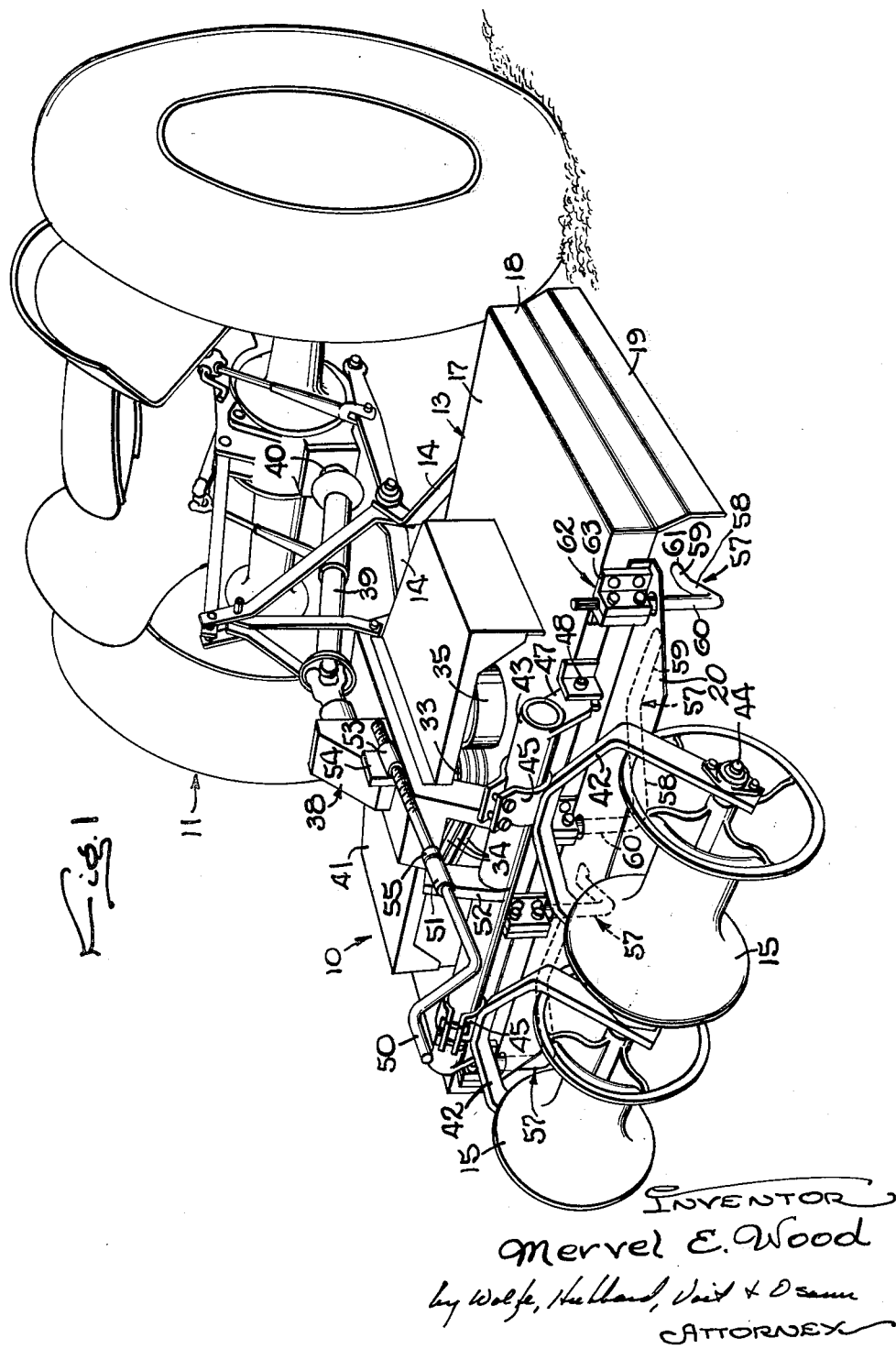

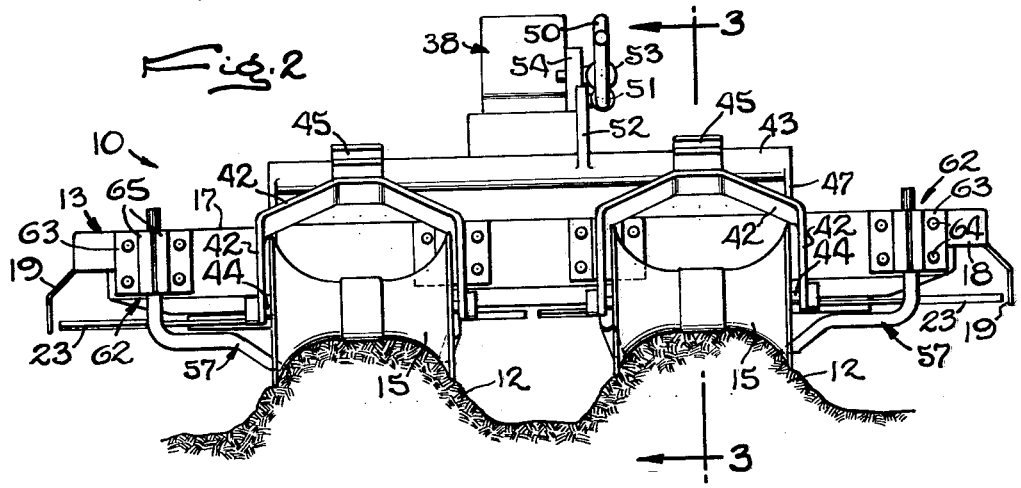
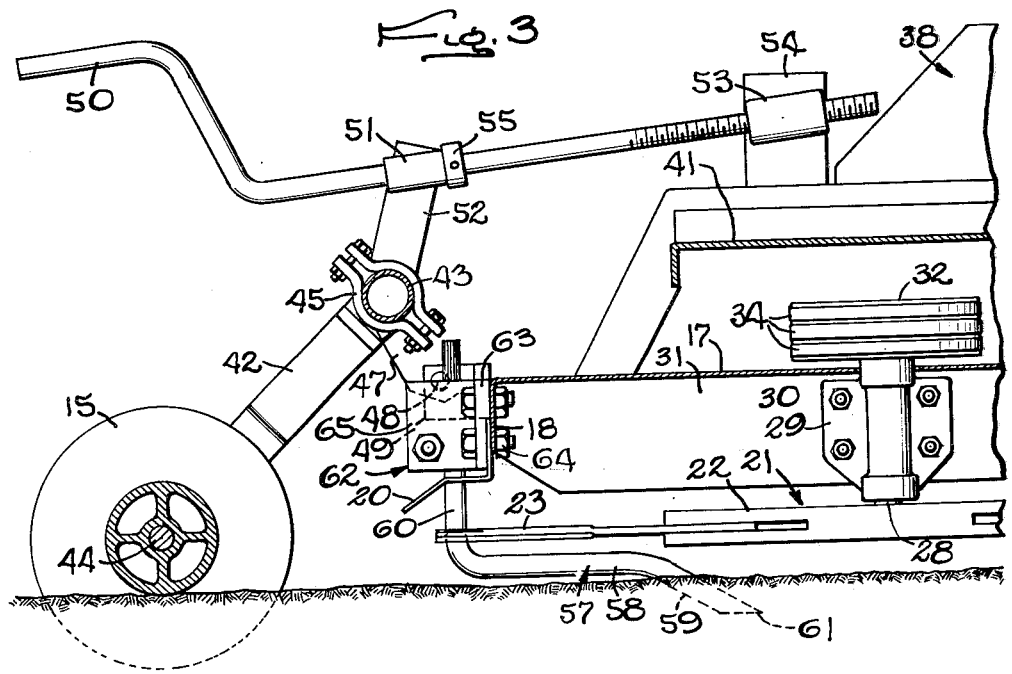

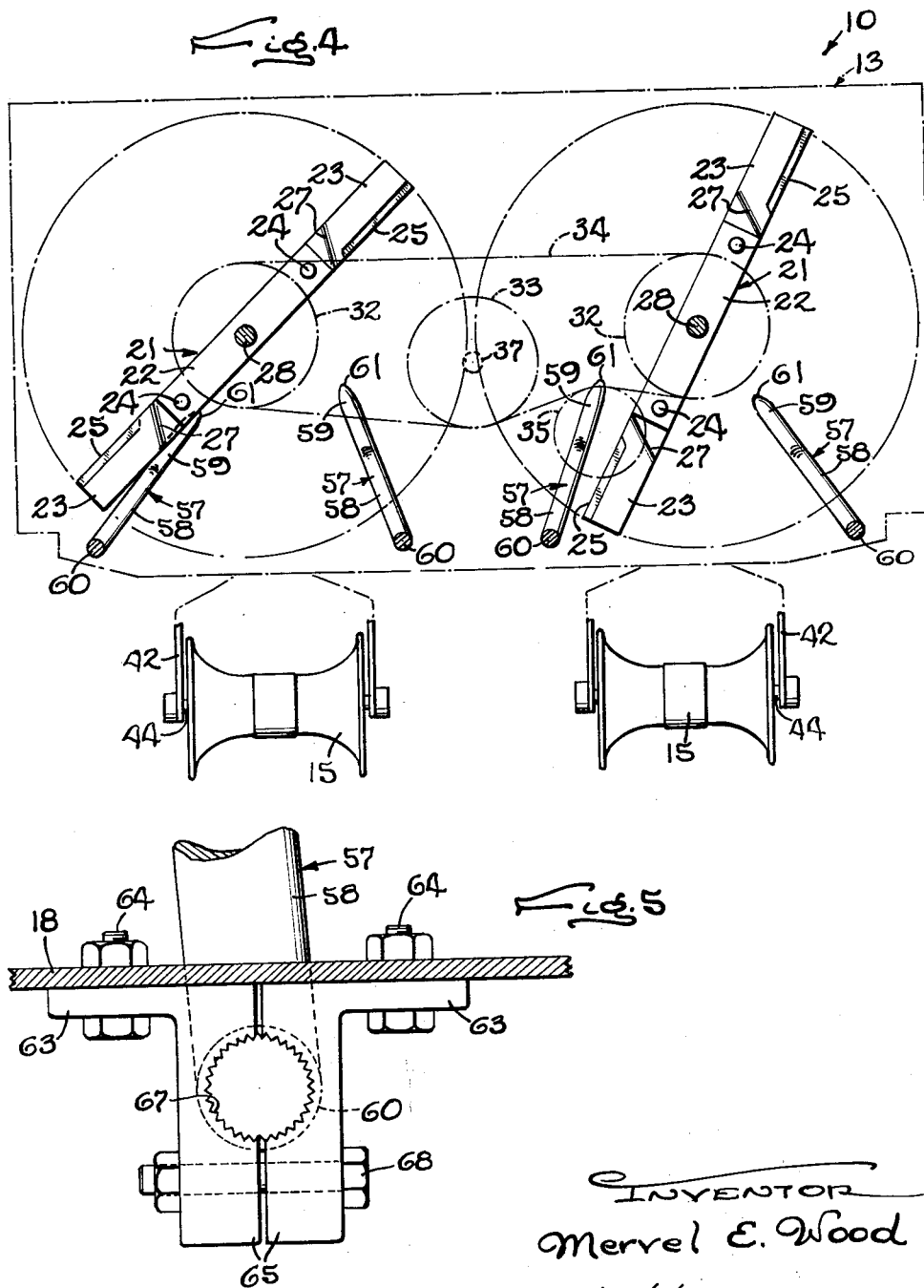

3,136,108
ROTARY MOWER WITH VINE LIFTERS
Mervel E. Wood, Oregon, Ill., assignor to Wood Brothers Manufacturing Company, Oregon, Ill., a corporation of Illinois
Filed Oct. 15, 1962, Ser. No. 230,366
9 Claims. (Cl. 56—25.4)

This invention relates to rotary mowers and, more particularly, to mowers for use in severing and clearing the foliage of a crop such as potatoes which are grown in raised rows or hills. Such mowers include a blade assembly rotating in a plane close to the crest of the hill to sever the vines along the crest, and have been equipped with vine lifters of various configurations for elevating the vines along the sides of the hill to a level above the blade to be cut thereby.

The primary object of the present invention is to provide a new and improved vine lifter which is extremely simple in construction and more effective and trouble free in operation than prior devices for this purpose.

A more specific object is to provide a novel vine lifter disposed below part of the path of the blades with a portion of the lifter closely adjacent the plane of rotation of the blades and with a lifting edge inclined downwardly and forwardly to a level well below the blades to pick up vines growing along the sides of the hills and feed the vines upwardly to a position closely adjacent the blades and thence into the blades from below.

Another object is to pull the vines laterally as well as upwardly away from the hills thereby increasing the effectiveness of the lifters.

A further object is to mount the lifters adjacent the rear of the frame and utilize rear-mounted wheels to maintain the alinement of the lifters with the hills.

Still another object is to adjust the spacing, angles, and height of the lifters in a novel manner to fit varying field conditions.

Another object is to utilize the blades themselves to assist in feeding vines into the blades from below.

The invention also resides in the extremely simple and inexpensive form of lifter employed.

Other objects and advantages of the invention will become apparent from the following detailed description taken in connection with the accompanying drawings, in which FIGURE 1 is a fragmentary perspective view of a tractor and a rotary mower embodying the novel features of the present invention.

FIG. 2 is a fragmentary end view taken from the rear of the mower shown in FIG. 1 and showing one set of positions for the lifters and the wheels.

FIG. 3 is an enlarged fragmentary sectional view taken along the line 3—3 of FIG. 2.

FIG. 4 is a schematic plan view of various parts of the mower with the lifters and wheels in different positions as compared to FIG. 2.

FIG. 5 is an enlarged fragmentary plan view of a portion of FIG. 3 showing the lifter and its mounting on the mower frame.

As shown in the drawings for purposes of illustration, the invention is incorporated in a rotary mower 10 adapted to be pulled by a tractor 11 (FIG. 1) along raised rows or hills 12 (FIGS. 2 and 3) to sever and shred the foliage of a crop such as potatoes growing along the crests of the hills. In this manner, the mower 10 clears the hills of potato vines preparatory to the digging and collection of the potatoes.

Such mowers include a generally rectangular frame 13 hitched to the tractor 11 by a tongue which herein is formed by two bars 14 (FIG. 1) projecting forwardly from the front end of the frame. The frame is supported above the ground by the tractor at the front and by wheels 15 mounted on the rear end of the frame and disposed below the level of the latter to roll along the ground.

The mower frame is formed by a rectangular plate 17 (FIGS. 1 and 3) normally generally horizontally disposed with flanges 18 bent downwardly from all four edges of the plate. Depending side skirts 19 and a rear skirt 20 cooperate with the plate 17 to define a cutting chamber below the plate substantially enclosed on three sides and opening toward the front. At least one rotary blade assembly 21 is housed in this chamber.

As shown in FIG. 4, the illustrative mower includes two laterally spaced blade assemblies 21 which increase the operating width of the mower sufficiently to cover two normally spaced hills 12 in one swath. Each assembly comprises a central cross-bar 22 with blades 23 suitably secured to its ends as by pivots 24 (see FIG. 4) and projecting outwardly therefrom. The leading edges 25 of the blade tips are sharpened and twisted downwardly along lines 27 spaced from the outer ends as shown in FIGS. 2 and 3.

Supporting the crossbars 22 are two upright spindles 28 (FIGS. 3 and 4) projecting upwardly through and journaled in spindle housings 29 (FIG. 3) secured by machine screws 30 to braces 31 spanning the front and rear flanges of the frame plate 17. The crossbars are fast on the lower end of the spindles to rotate therewith. On the upper end of each spindle is a V-grooved sheave 32 driven by a sheave 33 through one or more endless V-belts 34 trained around the sheaves and held against the driving sheave by an idler pulley 35, this being shown most clearly in FIG. 4. To drive the blade assemblies 21, the sheave 33 is mounted on a shaft 37 connected through suitable gearing at 38 (FIG. 1) and an extensible drive shaft 39 to the power take-off 40 of the tractor 11. Preferably, a shield 41 substantially encloses the sheaves and the belts. The arrows in FIG. 4 show the direction of travel of the belts and the direction of rotation of the blades in the illustrative mower.

In this instance, the rear wheels 15 are mounted on the frame 13 by means of U-shaped yokes 42 fast on a shaft 43 extending across the rear end of the frame, the yokes projecting rearwardly and downwardly from the shaft and carrying the wheels on axles 44 spanning the legs of the yokes. The forward ends of the yokes are welded to sleeves 45 which are clamped around the shaft. Adjacent the opposite ends of the latter are radially projecting arms 47 pivotally connected at 48 to rearwardly projecting lugs 49 on the rear flange of the frame plate thereby mounting the shaft on the frame for pivotal movement about the axis defined by the pivots 48. It will be seen that clockwise movement of the shaft 43 raises the wheels 15 and thus lowers the frame and the blades, while counterclockwise movement lowers the wheels and raises the frame.

A hand crank 50 is provided to adjust and hold the level of the frame. For this purpose, the crank is journaled in a sleeve 51 pivoted on a post 52 projecting generally upwardly from the shaft 43 and is threaded into a nut 53 pivoted on another post 54 fast on and projecting upwardly from the shield 41. A stop 55 on the crank shaft prevents forward axial movement of the sleeve and the post relative to the crank. Accordingly, turning of the crank in one direction or the other moves the stop forwardly or rearwardly and the shaft 43 thus is rotated to swing the wheels upwardly or downwardly relative to the frame. The weight of the frame tends to swing the post 52 forwardly and thereby holds the sleeve 51 against the stop 55.

In operation, the wheels are positioned to hold the frame 13 generally horizontal with the blade assemblies 21 rotating in a plane just above the crests of the hills. Thus, the blade tips 25 sever the vines along the crests of the hills and, because of the downwardly twisted tips, throw the severed vines upwardly into the cutting chamber to be shredded therein before being discharged from the mower. To insure that even the vines disposed along the sides of the hills well below the plane of the blades are shredded, laterally spaced lifters 57 are provided to travel along the sides of each hill, pick up these vines, and elevate them to the level of the blades.

The present invention contemplates the provision of new and improved vine lifters 57 which are extremely simple in construction and more effective and trouble free in operation than prior devices for this purpose. To these ends, each lifter includes a portion 58 disposed beneath the path of the associated blade assembly 21 with a lifting edge 59 inclined forwardly and downwardly from a level closely adjacent the plane of rotation of the blades to travel along the side of the hill well below the level of the blades. Accordingly, the lifting edges 59 pick up the vines and feed the same upwardly into the blades as the mower is pulled along the hill.

In the interest of simplicity, each lifter takes the form of a generally L-shaped rod with one arm 60 of the L vertically disposed when the frame is horizontal. This arm is secured to the frame behind the blade assembly and extends downwardly to a level below the plane of the blades. The other arm of the L projects forwardly beneath and preferably parallel to the plane of the blades (see FIG. 3). Thus, this arm 58 is generally horizontal in the normal operating position of the frame.

To form the lifting edge 59, the free end portion of the rod is bent downwardly at a suitable angle which may be on the order of twenty degrees with the generally horizontal arm 58 and the plane of the blades. The tip of the rod is cut off at an angle to form a relatively sharp point 61 capable of digging into the side of the hill and traveling along the latter slightly below the surface.

Herein, the lifter rods are secured to the frame by means of clamps 62 (see FIG. 5) comprising laterally projecting flanges 63 bolted at 64 to the rear flange of the frame plate with integral rearwardly projecting lugs 65 cooperating to define between them a downwardly opening cylindrical seat 67 in which the vertical arm 60 of the rod is clamped by bolts 68 passing through the lugs. The arm 60 is axially knurled or serrated (see FIG. 5) and the seats 67 are correspondingly knurled so that the rods are held securely in the clamps in predetermined angular positions.

It will be apparent that the spacing and width of hills 12 will vary somewhat from one field to another. With the lifters mounted in the clamps 62 and the latter spaced apart a distance substantially greater than the normal width of hills, selective angular adjustment of the arms 58 in a plane paralleling the plane of the blades is accomplished simply by loosening the clamps and rotating the arms 60 therein. This swings the tips 61 closer together or farther apart to adjust the tips to the width of the hill. Moreover, because of the forward convergence of the lifters, vines are pulled laterally away from the sides of the hills while being lifted into the blades. It will be apparent that the dual action improves the effectiveness of the lifters.

The arms are supported as close to the blades as possible without danger of being forced upwardly into the blades upon encountering a rock or the like in the hill. The preferred spacing is three-quarters of an inch to one inch below the blades so that vines fed onto the arms are close enough to be forced or drawn into the blades. It will be seen that the updraft created by the fan action of the twisted blade tips tends to suck vines upwardly into the blades. Thus, the maximum spacing in a given situation will depend upon the weight of the vines being mowed. With light, dry vines, a spacing of two inches will be satisfactory, while heavy and thick vines require a fairly close spacing to avoid bunching and clogging on the lifters. The clamps 62, when loose, also permit axial sliding of the arms 60 for adjustment of the level of the arms 58 relative to the plane of the blades.

In this instance, the wheels 15 are of concave longitudinal cross-section to fit over the crests of the hills being mowed and ride along the hills to act as guides for the mower. The sleeves 45 mounting the yokes 42 on the shaft 43 are releasably clamped to the shaft to permit adjustment of the lateral spacing of the wheels to conform to the spacing of the rows in a particular field. With the lifters 57 supported on the rear of the frame close to the wheels, the position of the tips 61 relative to the hill is accurately controlled to insure a slight and continuing penetration of the hillside despite minor variations in the path followed by the tractor.

Two different sets of positions of the wheels 15 and the lifters 57 are shown in FIGS. 2 and 4. In FIG. 2, the hills 12 are relatively closer together and the outer two lifters are disposed at a relatively large angle of approximately forty-five degrees with the path of the mower while the inner two lifters project forwardly at a smaller angle. In FIG. 4, both lifters of each pair have been adjusted to fit hills spaced farther apart. The wheels, of course, are adjusted laterally to ride along the crests of the hills.

As the mower is pulled along the hills with the blades rotating close to the crests and the lifter tips digging slightly into the hillsides, vines along the crests are severed and shredded and vines on the sides are pulled away from the hills and lifted upwardly by the lifting edges 59 to slide along the latter onto the horizontal arms 58. In this position close to the rotating blades, the vines are forced or drawn into the blades and shredded thereby. Any tendency of the vines to bunch up or jam the mower is eliminated because of the slight clearance between the horizontal arms and the plane of rotation of the blades. Thus, an effective and trouble-free vine clearing mower has been provided in a simple and inexpensive manner.

I claim as my invention:

1. In a rotary mower for cutting vines and the like growing on a raised row of ground, the combination of, a frame, means for supporting said frame above the row and for movement along the row, a blade disposed below said frame and mounted thereon for rotation along a path in a generally horizontal plane adjacent the crest of the row to sever vines along the crest, a pair of L-shaped rods forming lifters laterally spaced to lie on opposite sides of the row and each having a generally vertical arm extending downwardly from the frame behind the rear portion of the path of the blade to a level below said plane and a generally horizontal arm extending forwardly beneath said path and said plane with the leading end of said horizontal arm spaced rearwardly from the leading edge portion of said path, means supporting said lifters on said frame with said horizontal arms in spaced relation with the plane and path of rotation of said blade, and a tip portion on the leading end of each of said arms inclined downwardly and forwardly therefrom, said tip portions terminating in tips spaced apart to travel along the opposite sides of the row, pick up vines thereon, and feed the vines upwardly onto said horizontal arms and and into said blade as the mower advances along the row.

2. A mower as defined in claim 1 in which said mounting means for the lifters comprise clamps releasably gripping said vertical arms whereby the angle of the horizontal arms relative to the row, the spacing of said tips, and the spacing of the horizontal arms below said plane are selectively adjustable.

3. In a rotary mower for cutting vines and the like growing on a raised row of ground, the combination of, a frame, means for supporting said frame above the row and for movement along the row, a blade disposed below said frame and mounted thereon for rotation along a path in a generally horizontal plane adjacent the crest of the row to sever vines along the crest, a pair of lifters supported on said frame behind the path of said blade and each including a generally horizontal arm extending forwardly beneath a portion of said path at a level spaced below said plane, said lifters being laterally spaced to lie on opposite sides of the row with the forward ends of said horizontal arms spaced rearwardly from the leading edge portion of said path, and a tip portion on the forward end of each of said arms inclined downwardly and forwardly to terminate in a tip spaced well below said plane, said tips being spaced apart to pass closely along the opposite sides of the row to pick up vines thereon and feed the vines upwardly onto said arms and into said blade from beneath the latter as the mower advances along the row.

4. A mower as defined in claim 3 in which said arms and tip portions converge forwardly whereby the vines are pulled laterally as well as upwardly away from the sides of the hills.

5. A mower as defined in claim 3 including means mounting said lifters on said frame both for selective angular and vertical adjustment relative to the frame thereby to vary the spacing of said tips, the convergence of the arms, and the spacing of the arms below said plane.

6. A mower as defined in claim 3 in which said lifters are supported on said frame behind said path and said horizontal arms are disposed beneath the rear portion of said path.

7. A mower as defined in claim 6 in which said supporting means includes at least one guide wheel of concave cross-section contoured to fit over and ride along the crest of the row, said wheel being supported on the rear portion of said frame close to said lifters thereby to maintain the positioning of the lifters relative to the sides of the row.

8. A mower as defined in claim 3 in which said blade is twisted and disposed at an angle relative to said plane thereby to create an updraft cooperating with said lifters to elevate vines toward the underside of said blade.

9. In a rotary mower for cutting vines and the like growing on a raised row of ground, the combination of, a frame, means for supporting said frame above the row and for movement along the row, a blade mounted on said frame for rotation along a circular path in a generally horizontal plane adjacent the crest of the row, and a pair of lifters supported on said frame and laterally spaced apart to lie on opposite sides of said row, each of said lifters including a downwardly and forwardly inclined tip portion terminating in a tip positioned to travel along the sides of the hill below said plane, the upper ends of said tip portions being spaced inwardly from the radial ends of the blades and spaced below a portion of said path, and a generally horizontal arm extending rearwardly from the upper end of each tip portion whereby said lifters pick up vines along the sides of the hill and feed the vines upwardly toward said plane and into the path of said blade from beneath the latter.

References Cited in the file of this patent
UNITED STATES PATENTS

| | | |
|---|---|---|
| 202,531 | Forlow | Apr. 16, 1878 |
| 1,030,475 | Manson | June 25, 1912 |
| 1,831,658 | Groenig et al. | Nov. 10, 1931 |
| 2,478,558 | Beranek et al. | Aug. 9, 1949 |
| 2,544,023 | Johnson | Mar. 6, 1951 |
| 2,634,569 | Raney et al. | Apr. 14, 1953 |
| 2,649,678 | Sishc | Aug. 25, 1953 |
| 2,815,631 | Northcote et al. | Dec. 10, 1957 |
| 2,917,119 | La Monaca | Dec. 15, 1959 |
| 3,011,299 | Classon | Dec. 5, 1961 |